(For manual transmission)

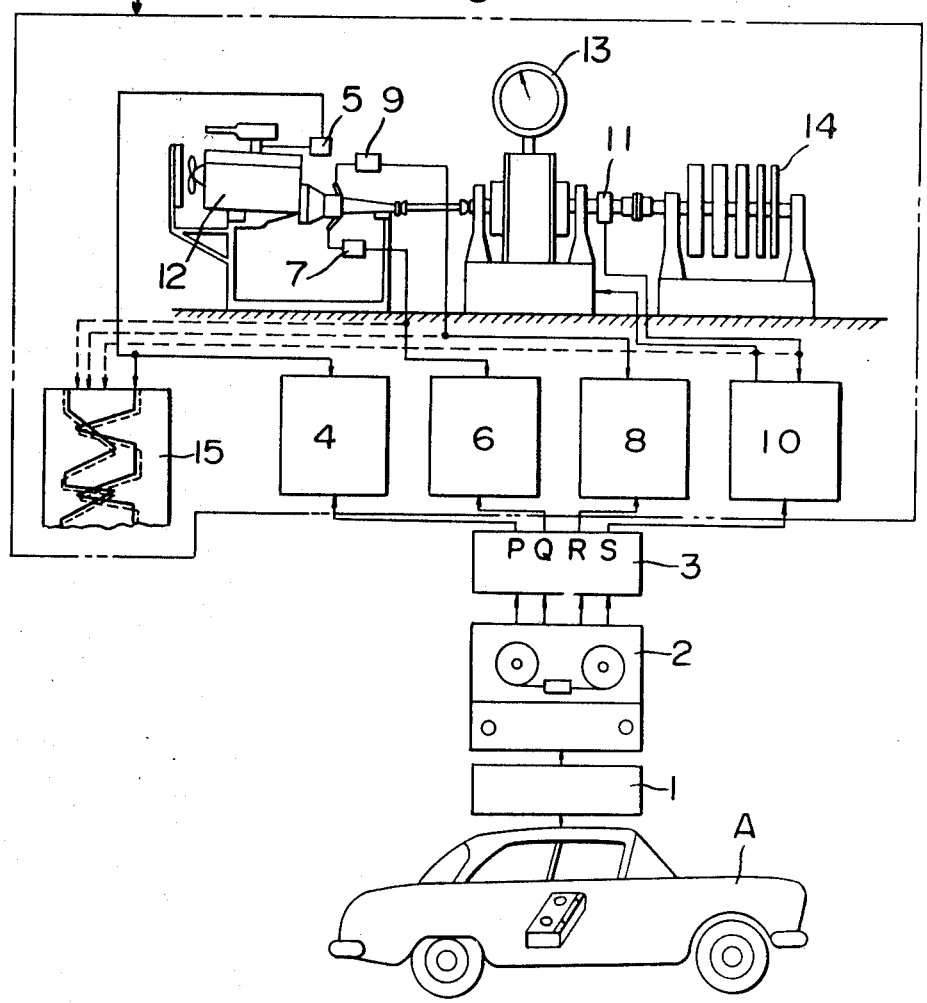

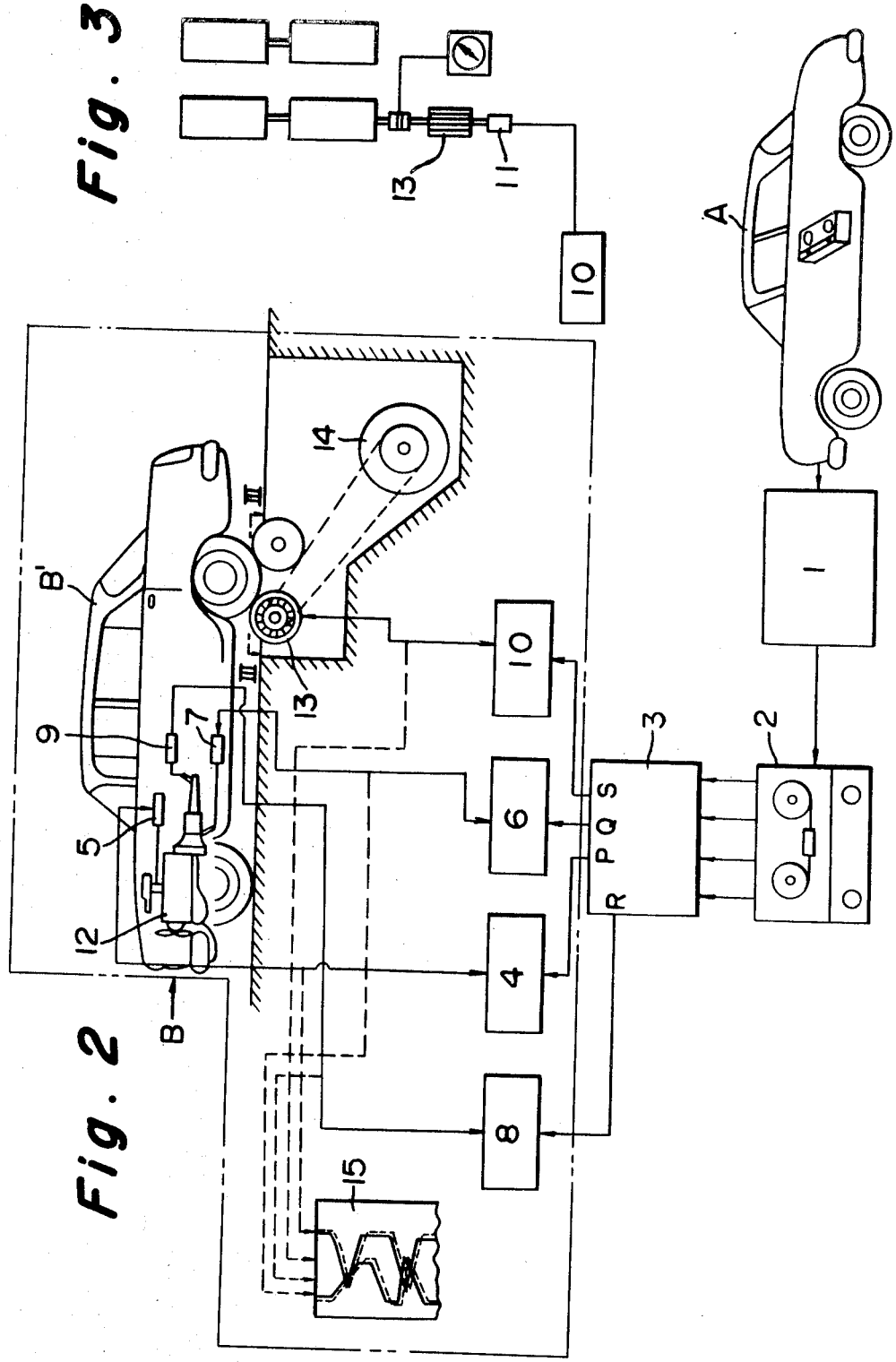

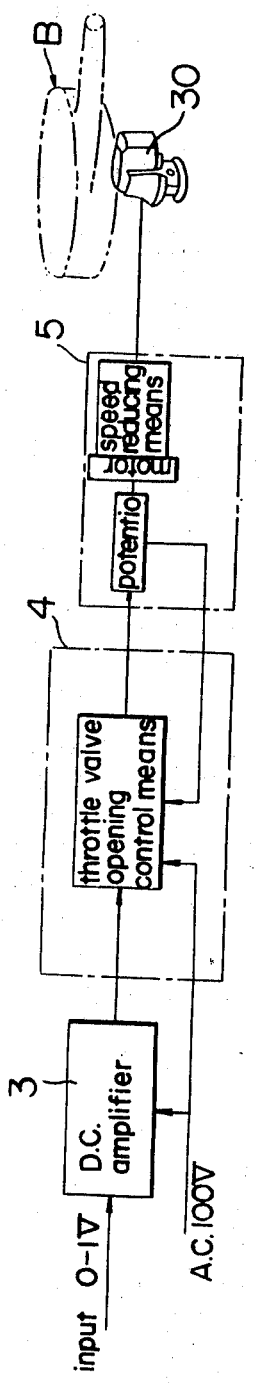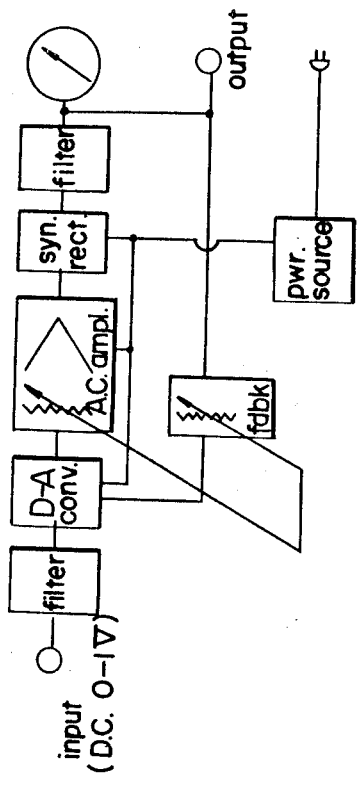

① second gear
② output curve for throttle valve at full open
③ top gear
④ output curve for throttle valve at a constant opening (For automatic transmission)

① output curve for throttle valve at full open
② output curve for throttle valve at a constant opening Floor shift type Handle shift type United States Patent Office
3,516,287
Patented June 23, 1970

3,516,287
DEVICE FOR PROGRAMMED OPERATION OF AN AUTOMOBILE ON A TEST PLATFORM
Tadashi Masuda and Tadashi Hashimoto, Yokohama, Japan, assignors to Nissan Jidosha Kabushiki Kaisha, Yokohama, Japan
Filed May 27, 1968, Ser. No. 732,435
Claims priority, application Japan, June 28, 1967, 42/41,118
Int. Cl. G01m 15/00
U.S. Cl. 73—117      4 Claims

ABSTRACT OF THE DISCLOSURE

A device for programmed operation of an automobile on a test platform, which is controlled by electric signals collected and recorded by running an automobile through actual streets. The electric signals represent information on at least the carburetor throttle valve opening and automobile speed. The revolving speed and output from the driving machine of the automobile being tested are controlled and measured by a dynamometer.

---

This invention relates to a device for programmed operation of an automobile on a test platform, more particularly to a device for operating an automobile or a driving means thereof, under reproduced running conditions on a test platform equipped with various measuring instruments, such as an engine dynamometer, a chassis dynamometer, an exhaust gas analyzer, and the like, for the purpose of endurance test and performance test.

Automobiles have heretofore been tested either by simulating the actual running conditions on a test platform with manual operation of the automobile engine while measuring the output thereof with a dynamometer of the test platform, or by actually running the automobile in a test field. Such known test methods, however, have a disadvantage in that the actual running conditions cannot be reproduced accurately, because different drivers, such as private automobile owners and test drivers, have different driving habits. It is also very difficult to reproduce exactly actual road conditions in test fields.

Lately, air pollution by automobile exhaust gas has become a serious social problem, and accordingly, there is an increased need for laboratory test by reproducing actual automobile running conditions on a test platform, so that certain running patterns can be repeatedly produced on the test platform to facilitate chemical analysis of the exhaust gas, as well as measurement of the power unit performance related to each exhaust gas condition.

To meet such need, it has been proposed heretofore to use a programmed operational control system including an automatic control circuit to produce certain predetermined target operational conditions. However, known programmed operational control systems of this kind have shortcoming in that they can produce only very simple programs for operation, because only two factors, namely the negative pressure at an engine intake manifold and the engine revolving speed, are used as input informations. To reproduce complicated actual running conditions, such as quick acceleration, quick deceleration, gradual alternation of acceleration and deceleration, and the like, many other additional informations are necessary. The known programmed operational systems are not capable of reproducing complicated running conditions of automobiles. For instance, accurate representation of complicated automobile operation requires additional information, such as that pertaining to the degree of throttle valve opening, as determined by the accelerator pedal position, engagement or disengagement of a clutch, operative condition of a speed change gear, as determined by speed change lever position, operative condition of a brake, etc.

Therefore, an object of the present invention is to obviate the aforesaid difficulties of known automobile test devices by providing an improved device for programmed operation of an automobile on a test platform. In the device according to the present invention, various running conditions of an automobile, including the degree of throttle valve opening for regulating engine output, the operative conditions of a clutch and a brake, the operative stage of a speed change gear, the automobile speed, etc., are converted into electric signals; said electric signals are recorded on a suitable recording medium, such as a magnetic tape; and then said electric signals thus recorded are reproduced and applied to corresponding parts of an automobile, or a machine, being tested on a test platform, more particularly to a throttle valve, a clutch, a brake, a speed change gear etc. The electric signals are also applied to measuring instruments attached to the test platform. Thereby, the actual automobile running conditions can be reproduced accurately on the test platform.

In the case of testing an automobile having an automatic speed change gear, instead of a manually controlled speed change gear, the device for programmed operation according to the present invention can be simplified by dispensing with electric signals representing operative conditions of a clutch and a speed shifting means.

For a better understanding of the invention, reference is made to the accompanying drawings, in which:

FIGS. 1 and 2 are schematic diagrams, partially in block, showing construction of a device for programmed operation of a driving machine or an automobile on a test platform, respectively according to the present invention;

FIG. 3 is a partial plan view taken on arrows III—III of FIG. 2;

Figure 6:
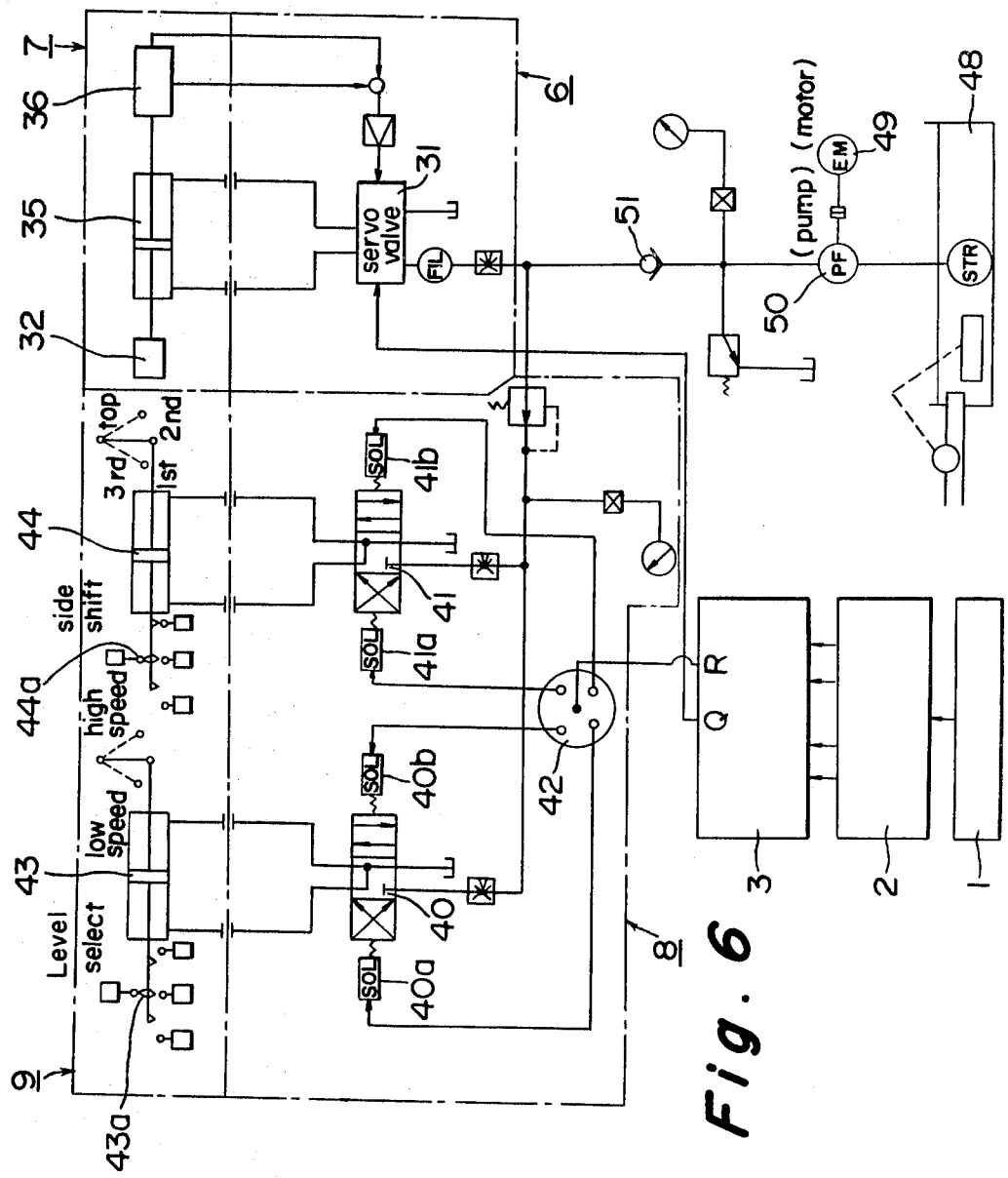
Figure 7A:
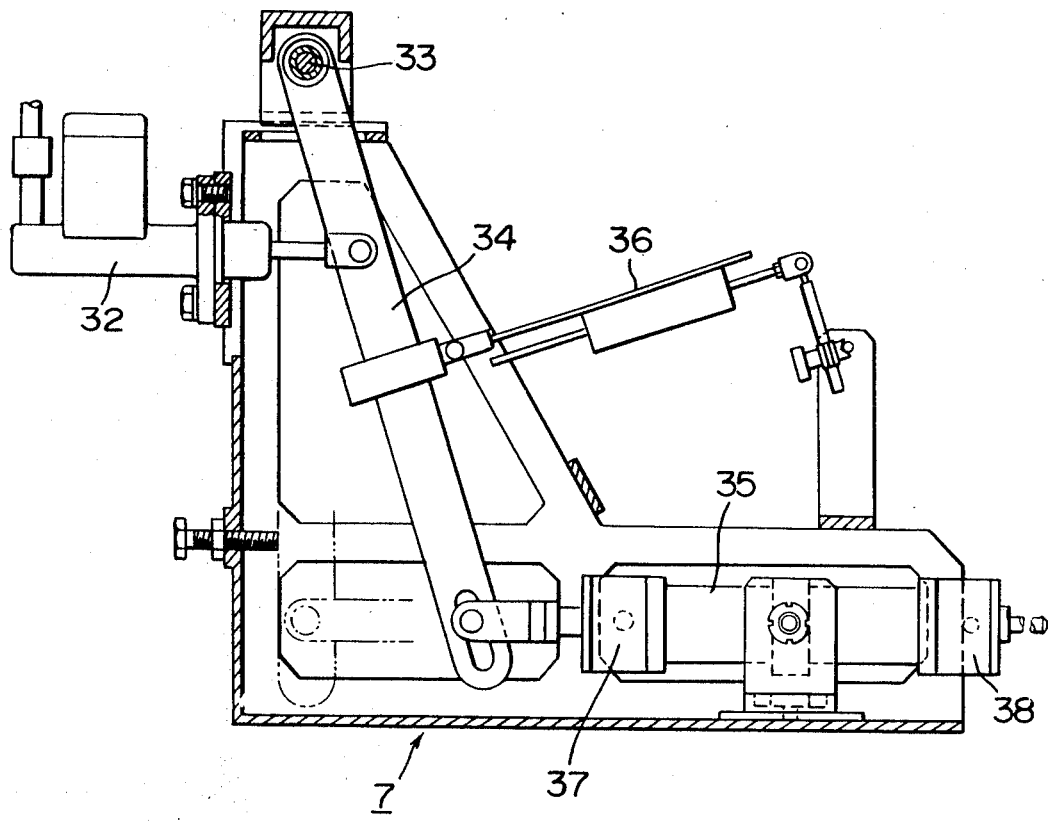
Figure 7B:
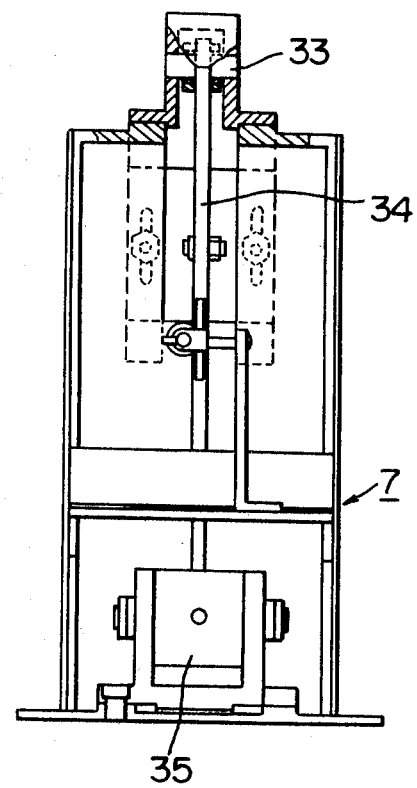
Figure 8A:
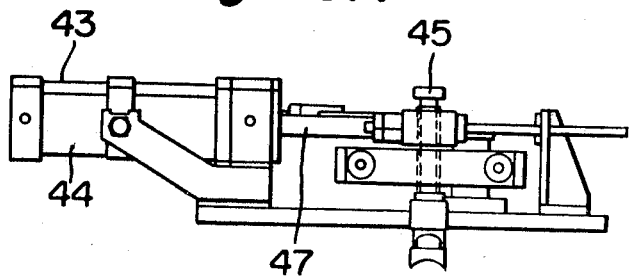
Figure 8B:
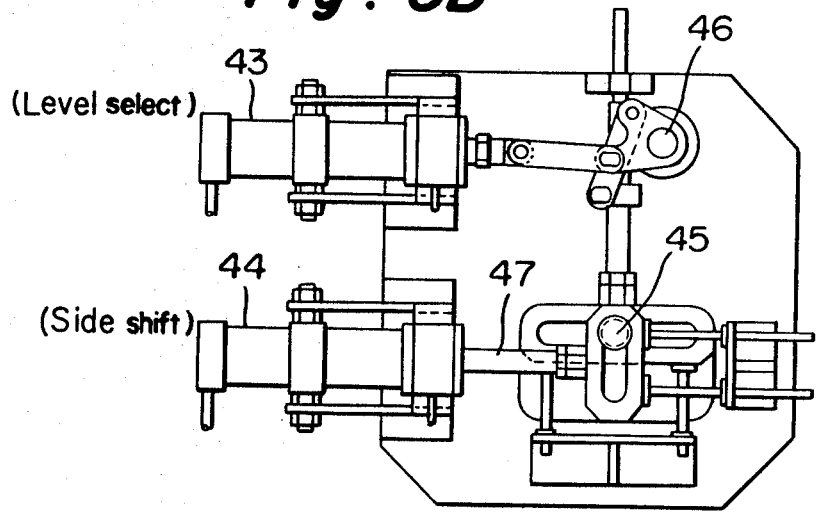
Figure 8C:
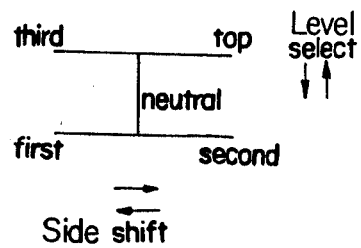
Figure 9:
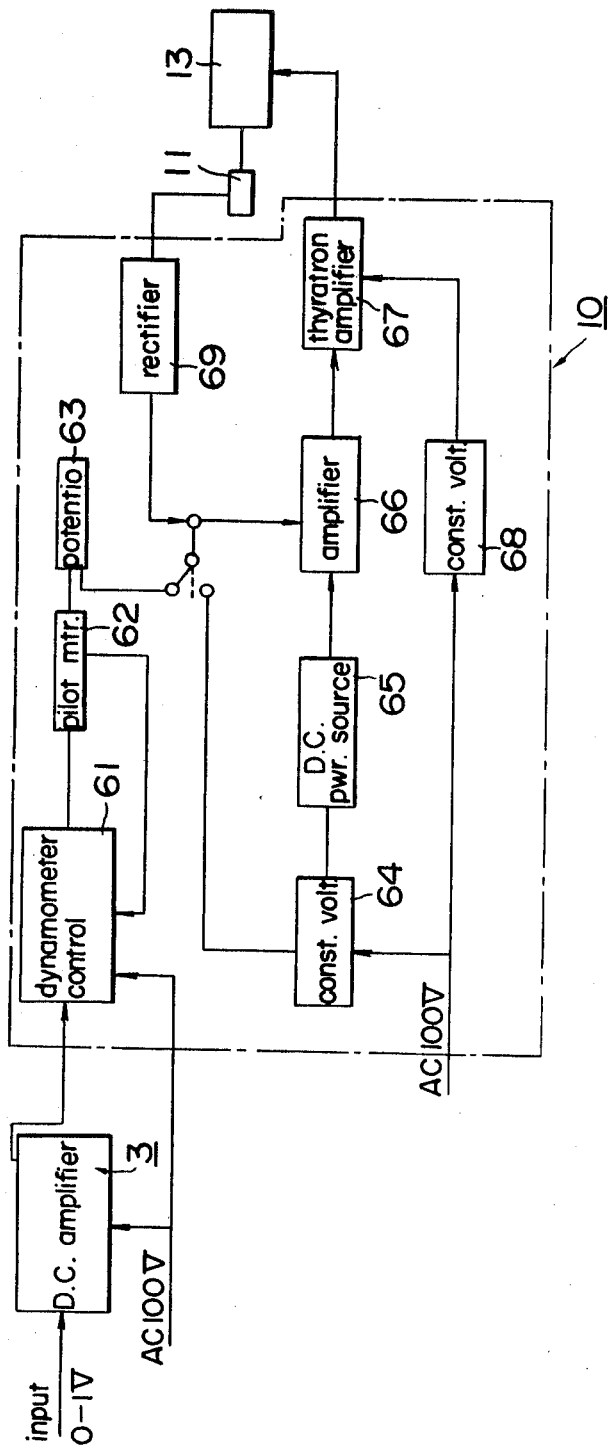
Figure 10:
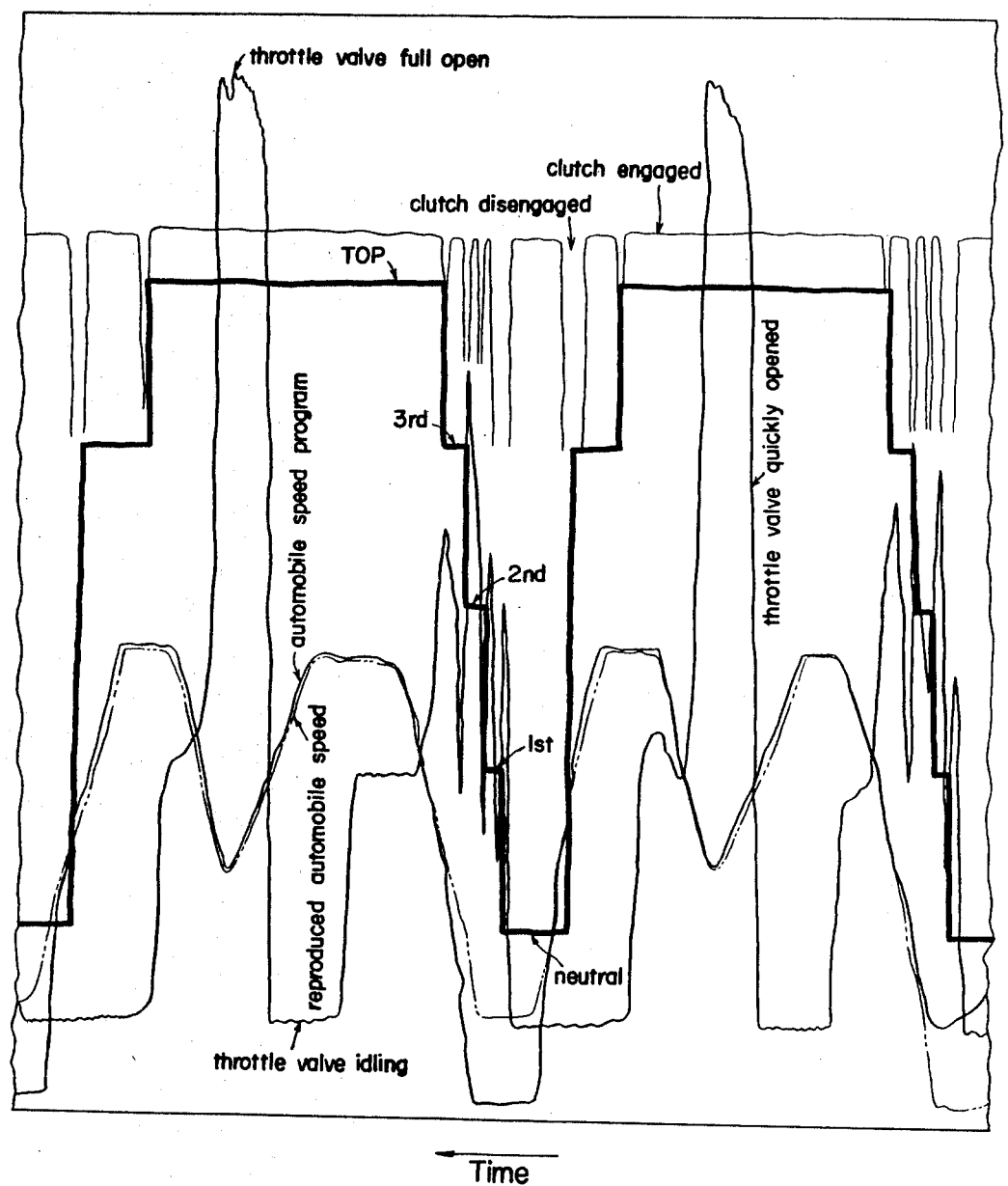
Figure 11:
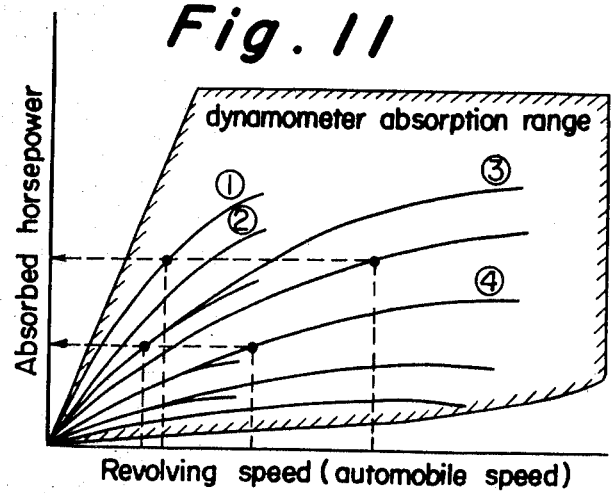
Figure 12:
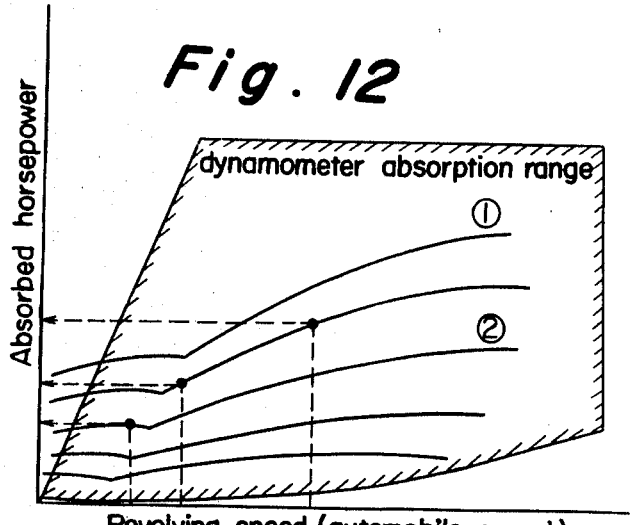
Figure 13:
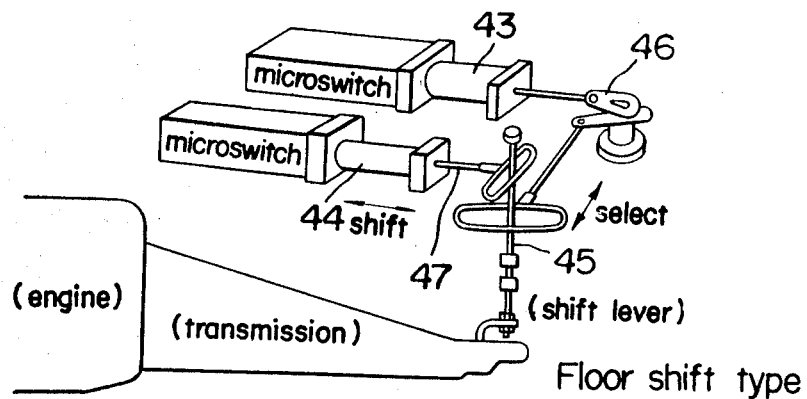
Figure 14:
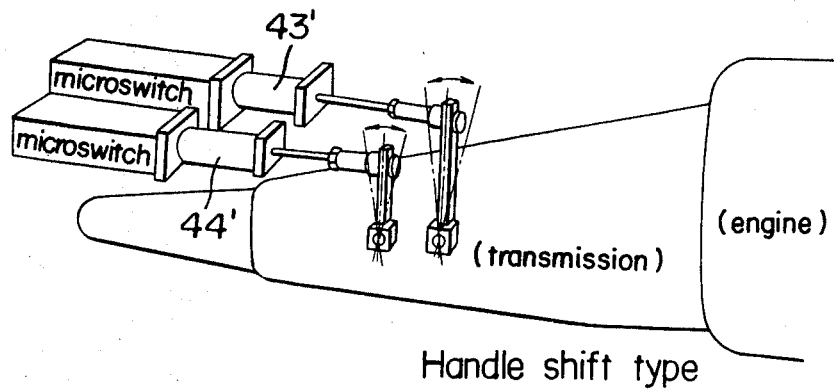
Figure 15:
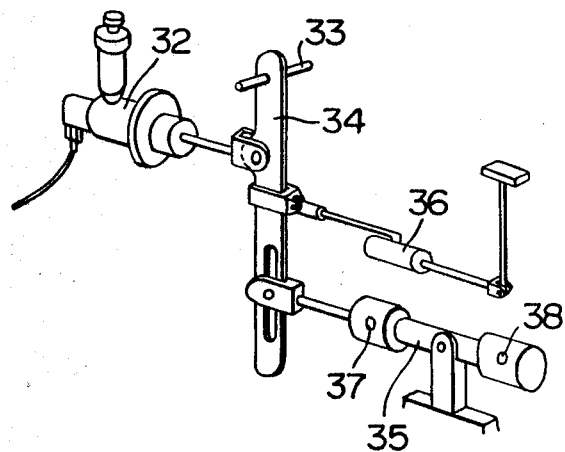

FIGS. 5–A and 5–B are block diagrams, showing a means to control a throttle valve of an automobile mounted on a test platform, and a D.C. amplifier therefor, respectively;

FIG. 6 is a schematic diagram of a hydraulic control system, to control a clutch and a speed change gear;

FIGS. 7–A and 7–B are, respectively an elevation and a side view, showing a servo-cylinder to actuate a clutch;

FIG. 8–A is a side elevation of a hydraulic cylinder to actuate a speed change lever operatively connected to a speed change gear;

FIG. 8–B is a plan view of the hydraulic cylinder;

FIG. 8–C is a diagrammatic illustration of the operative principles of the hydraulic cylinder;

FIG. 9 is a block diagram of a device to control the automobile speed by regulating the power absorbed by a dynamometer;

FIG. 10 is a graph, showing operative patterns, corresponding to program data for simulating the conditions for driving through city center streets;

FIG. 11 is a graph showing power unit performance characteristics of an engine having a manually operated speed change gear;

FIG. 12 is a graph similar to FIG. 11, showing power unit performance characteristics of an engine having an automatic speed change gear;

FIG. 13 is a schematic perspective view of a floor-shift type speed shifting device of a speed change gear;

FIG. 14 is a schematic view of a remotely operated speed shifting device of a speed change gear; and FIG. 15 is a schematic perspective view of a clutch controlling device.

Similar parts are designated by similar numerals and symbols throughout the drawings.

Referring to FIG. 1 illustrating an embodiment of the invention, information related to operating conditions of an actually running automobile A are at first recorded on a recording-reproducing means 2 through a transducer 1. For reproducing the operating conditions on a test platform, the aforesaid informations are reproduced from the recording-reproducing means 2 and fed to a test device B through an amplifier 3. In this particular embodiment, as shown in FIG. 1, the test device B is adapted to test a driving machine 12 of an automobile, which driving machine comprises an engine, a clutch, and a speed change gear. For this end, the test device B consists of control means designated by numerals 4 to 11, a driving machine 12 being tested, a dynamometer 13 coupled with the driving machine 12, a compensator 14 coupled with the dynamometer 13 to compensate for the automobile inertia, and a recorder 15.

Figure 4:
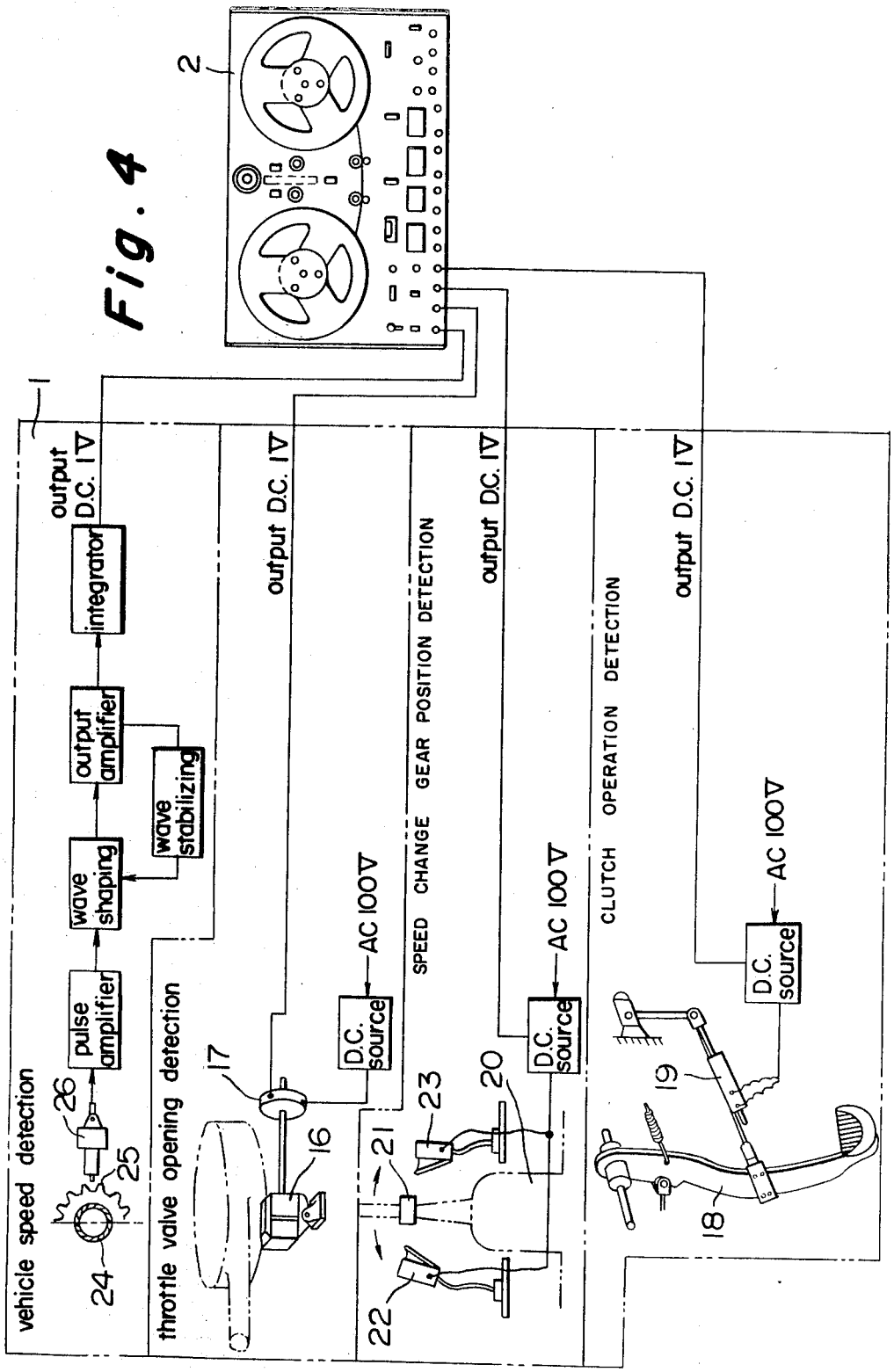
FIG. 4 is a diagrammatic illustration, with a part thereof in block, showing a magnetic recording device for recording automobile running conditions.

The transducer 1 converts the information on operative conditions of the moving automobile A into electric signals and transmit them to the recording-reproducing means 2, as shown in FIG. 4. Referring to the figure, to detect the degree of value opening a rotary potentiometer 17 is mounted on the valve stem of a carburetor throttle valve 16 for controlling engine output of the automobile A. The construction of the potentiometer is such that as the throttle valve stem rotates 0 to 90 degrees, as measured from certain reference angular position, the potentiometer output D.C. voltage varies continuously from 0 to 1 volt.

A rheostat type potentiometer 19 is connected to a clutch pedal arm 18 of the automobile A, and as the arm 18 makes a 0 to 50 mm. stroke from a certain reference position thereof, the output D.C. voltage of the potentiometer 19 varies from 0 to 1 volt.

A speed change gear 20 has a change lever 21 and limit switches 22 and 23 mounted on the change lever 21.

Let it be assumed that the change lever 21 is adapted to occupy four operative positions, $P_1$ and $P_2$, and $P_3$ and $P_4$, and that the change lever 21 is at its "selected level" for the positions $P_1$ and $P_2$, and at its "shifted side" for the positions $P_1$ and $P_3$. Then, the four operative positions of the change lever 21 can be represented by the ON-OFF conditions of the two limit switches 22 and 23, for instance, by closing the limit switch 22 when the lever 21 is at its "selected level," while closing the limit switch 23 when the lever 21 is at its "shifted side." If the change lever 21 has five or more operative positions corresponding to five or more speed change ratios, one or more limit switches (not shown) can be added. In this particular embodiment, the limit switches are connected to a D.C. power source in such manner that a variable D.C. output voltage representing the change lever position is produced. For instance, in case of a change lever having five operative positions, it is possible to vary the output D.C. voltage in 5 steps, corresponding to five operative positions of the change lever 21, by dividing the full range, e.g. 0 to 1 volt, into five sections, in a manner known to the art.

To detect the vehicle speed, a magnetic pick-up 26 engages a gear 25 secured to an axle 24 of the automobile A, so as to generate pulses at a rate proportional to the revolving speed of the gear in a manner well known in the art. The pulses are then converted into a D.C. voltage by a known converting means, which, for instance, comprises a pulse amplifier, a wave shaping circuit, an output amplifier, a wave stabilizer, and an integrating circuit. In a preferred embodiment of the invention, as the revolving speed of the axle varies from 0 to 8,000 r.p.m., the D.C. voltage generated by the pick up 26 and the converting means, varies from 0 to 1 volt.

In this embodiment, the recording-reproducing means 2 is a portable magnetic tape recorder of FM type, capable of recording and reproducing electric signals in four or more tracks.

Referring to FIGS. 1 and 5-A, the 0 to 1 volt electric signals from each channel of the recording-reproducing means 2 are converted into A.C. voltages of 50 Hz. (cycle/sec) by a D–A converter incorporated in the amplifier 3, and the amplifier 3 amplifies the A.C. voltages thus prepared. The signals thus amplified are reconverted into D.C. signals by using transformers and rectifiers, and the D.C. signals are delivered to control means of the device B for operating the driving machine 12 on a test platform.

FIG. 5–B shows an embodiment of the D.C. amplifier 3, in which D.C. signal voltages are converted into A.C. signals by a D.C.-A.C. converter for amplification by an A.C. amplifier, and then the amplified A.C. signals are converted into D.C. signals again by rectifying. In other words, this D.C. amplifier is of A.C. amplification type, and its amplification characteristics are very stable. Moreover, by using a chopper, its noise level and drift level can be minimazed, to improve its sensitivity to a maximum.

Construction of various control means of the device B for operating an automobile on a platform will now be described in further detail.

Referring to FIGS. 1 and 5-A, the throttle valve of a carburetor 30 of a driving machine 12 being tested is controlled by a throttle valve opening control means 4 operatively connected to a servomotor 5, which is in turn connected to a valve stem of the throttle valve, as shown in FIG. 5–A. The connection among the servomotor 5, the throttle valve opening control means 4, and the amplifier 3 is such that the servomotor 5 controls the degree of opening of the throttle valve of the carburetor through a speed reducing means in response to the output signals from the amplifier 3. At the same time, the rotation of the servomotor 5 is detected by a potentiometer and the output from the potentiometer is fed to the throttle valve opening control means 4. Then the electric signal from the amplifier 3 is compared with the output signal from the potentiometer, and the difference between the two signals is applied to the servomotor 5.

FIG. 1 also shows a hydraulic control means 6 and a servo-cylinder 7, for controlling the engaging conditions of a clutch of the driving machine 12 being tested. Referring to FIG. 6, illustrating schematically the hydraulic control system usable in the device according to the present invention, the hydraulic control means 6 includes a servovalve 31, which is equipped with a built-in actuating coil to receive electric signals from the amplifier 3. The servovalve 31 is so adapted that when a signal responsive to disengagement stroke of the clutch is applied thereto, the oil pressure is selectively applied to either the left-hand or right-hand chamber of a hydraulic cylinder of the servo-cylinder 7.

As illustrated in FIGS. 7–A, 7–B, and 15, the servo-cylinder 7 comprises a clutch master cylinder 32 to engage and disengage a clutch of the driving machine 12 being tested, a link 34 rotatable around a pin 33, a hydraulic cylinder 35 operatively connected to said link 34, and a rheostat type potentiometer 36 connected to the link 34. When the hydraulic pressure is applied to the left-hand chamber 37 of the cylinder 35, the clutch is engaged. On the other hand, when the hydraulic pressure is applied to the right-hand chamber 38 of the cylinder, the clutch is disengaged. The operative position of the cylinder 35 is detected by the potentiometer 36, and the output from the potentiometer 36 is fed to the servovalve 31 as a feedback signal, as depicted in FIG. 6. The signal representing the operative position of the cylinder 35 is compared with the input signal from the amplifier 3, so that the difference between the two signals becomes the output from the servo-valve 31 for controlling the operation of the clutch.

FIG. 1 also shows another hydraulic control means 8 and a hydraulic cylinder means 9 for controlling the operative stage of a speed change gear of the driving machine 12 being tested. As illustrated in FIG. 6, the hydraulic control means 8 comprises a level selecting change-over valve 40 and a side shifting change-over valve 41. In addition, solenoids 40a, 40b are associated with the valve 40, while other solenoids 41a and 41b are associated with the valve 41. Each solenoid is connected to a selecting means 42, so that speed change gear change-over signals from the amplifier 3 can be selectively applied to the solenoids.

When a so-called H-type speed change system is employed, the solenoids are actuated in the following manner, in response to the following voltage signals reproduced from the recording-reproducing means 2.

Top: 1 volt, amplified to 20 volts, solenoids 40a and 41a actuated
Third: 0.75 volt, amplified to 15 volts, solenoids 40a and 41b actuated
Second: 0.5 volt, amplified to 10 volts, solenoids 40b and 41a actuated
First: 0.25 volt, amplified to 5 volts, solenoids 40b and 41b actuated
Neutral: 0 volt, no solenoid actuated The hydraulic cylinder means 9 comprises a level select cylinder 43 and a side shift cylinder 44 receiving signals from the aforesaid valves 40 and 41, and feedback means 43a and 44a such as position-responsive switches operatively connected to the cylinders. By those feedback means, the information on the operative stage of the speed change gear is fed to the hydraulic control means 8, so as to facilitate comparative control of the speed change gear. Referring to FIGS. 8–A, 8–B, 8–C, and 13, depicting details of the hydraulic cylinder means 9, upon application of the hydraulic pressure to either side of the level select cylinder 43, a lever 45 is reciprocated vertically by means of a link mechanism 46 to select either high speed or low speed. When the hydraulic pressure is applied to either side of the side shift cylinder 44, the change lever 45 is reciprocated horizontally by means of another link mechanism 47 at a vertical level determined by the level select cylinder 43. Thereby, the top or third speed change ratios of the speed change gear is selected when the speed change lever 45 is at the high level, while the second or first speed change ratio can be selected with the lever 45 held at the low level.

When the speed change gear is remotely controlled, the aforesaid hydraulic control cylinder means can be also used with a slight modification. For instance, a similar level select cylinder 43' is provided to axially move a gear ratio controlling shaft (not shown) between two levels, while a similar side shift cylinder 44' is provided to rotate the gear ratio control shaft between two sides through a suitable rack means (not shown).

In the particular embodiment, as illustrated in FIG. 6, the operative hydraulic pressure for both the clutch servo-cylinder 7 and the speed change hydraulic cylinder 9 is delivered from a common hydraulic pressure source, which comprises an oil tank 48, a pump 50 driven by a motor 49, and a check valve 51. It is also possible to provide separate hydraulic pressure sources for the two cylinder means.

Also illustrated in FIG. 1 are a speed controlling means 10, a tacho-dynamometer 11, or a revolving speed meter, mounted on the shaft of the dynamometer 13. FIG. 9 illustrates an example of speed control means 10 usable in the device according to the present invention. The illustrated speed control means 10 comprises a dynamometer setting means 61 which can be also used as an automatic position controlling means, a pilot motor 62, a potentiometer 63, a constant voltage circuit 64, a D.C. current source 65, an electron tube amplifier 66, thyratron amplifier circuit 67, and an A.C. constant voltage circuit 68. The signal from the amplifier 3 is transmitted to the dyanmometer 13 through the speed control means 10, and the loading of the dynamometer is so controlled as to attain the desired revolving speed of the driving machine 12 by absorbing the output power thereof by the dynamometer. The revolving speed of the driving machine or the dynamometer is detected by the tachometer 11, and the output signal from the tachometer 11 is fed to a rectifier 69 and the amplifier 66 of the speed control means 10, as a feedback signal. Thus, the output signal from the tachometer 11 representing the instantaneous revolving speed of the driving machine is compared with the input signal to the speed control means, and the difference between the two signals is delivered to the dynamometer 13.

The mass of the rotary portion of the dynamometer 13 is usually smaller than the mass, or the inertia, of an actual automobile under loaded conditions, and hence, a compensating means 14 is provided on a rotary shaft of the dynamometer, so that the actual quick acceleration and quick deceleration can be reproduced, as specified by the electric signals from the amplifier 3. The compensating means 14 may be constituted by securing a suitable number of disks on the rotary shaft of the dynamometer 13 in a concentric manner, and by selecting the same moment of inertia for the disks as that of the actual running automobile.

FIG. 2 shows another embodiment of the present invention, in which an automobile B' to be tested is placed on a test platform chassis in such a manner that the driving machine thereof is operatively connected to a dynamometer 13 of the test device B through the driving wheels of the automobile, so as to reproduce the actual running conditions of the automobile on the test platform. As illustrated in FIG. 3, the dynamometer 13 is provided with a speed control means 10 and a tachometer 11.

The operation of the device according to the present invention will now be described in further detail.

The recording-reproducing means 2 is put on an automobile A, while connecting the transducer 1 to a carburetor throttle valve, a clutch pedal arm, a speed change lever, and a propeller shaft, as shown in FIG. 4, so as to make record of running conditions of the automobile. Then the automobile A runs through streets, such as congested city areas and relatively less congested suburbs, to collect the aforesaid various data.

Then, a driving machine to be tested, which comprises an engine, a clutch, and a speed change gear, each being identical with the corresponding parts of the automobile A, is placed on a test platform chassis and connected to the dynamometer 13 and the inertia compensating means 14 to complete the device B for testing an automobile on the test platform, as shown in FIG. 1. It is also possible to place a complete automobile to be tested on the test platform chassis, as shrown in FIG. 2. There are also provided a fuel feeding system, a cooling system, a chemical analyzing system for exhaust gas, and the like, but are they are not shown in the drawings. Various control means of the driving machine 12 to be tested, such as means 4 and 5 to control the throttle valve of carburetor, means 6 and 7 to control clutches, means 8 and 9 to control speed change ratio, and means 10 and 11 to control the revolving speed, are arranged and connected to the device B, as shown in FIG. 1 or 2, so that the driving machine 12 can be run according to the specific program, as pre-recorded in the recording-reproducing means 2.

FIG. 10 shows data on the opening of the throttle valve, operation of the clutch, operating position of the speed change gear, the automobile speed (revolving speed), as recorded continuously by the recording device 15, when an automobile is run through city streets according to a given operative pattern. It is apparent from the figure that as the output speed of the speed change gear is increased from the neutral speed change ratio to the top position through first, second, and third speed change ratio, the clutch is disengaged and engaged at each shift of the speed change lever, or speed change ratios, of the speed change gear to increase the automobile speed. It is also seen that the throttle valve opening is increased gradually to the full open as the load increases to the maximum.

When the speed change ratio of the speed change gear is known, if the automobile speed and the degree of the carburetor throttle valve opening are determined, the magnitude of the load absorbed by the dynamometer from the driving machine to be tested, measured and determined, as long as the load is within the measureable range of the dynamometer, as illustrated in FIG. 11. The actual running conditions of an automobile can be automatically and substantially exactly reproduced on the test platform.

The embodiment described hereinbefore relates to a programmed operation of an automobile having a manual speed change gear whose speed change ratio is manually shifted. In the case of an automatic speed change gear, the clutch and the speed shifting means can be dispensed with. Accordingly, recording means for storing and reproducing operative conditions of the clutch and the shifting means can be also dispensed with. The variation of the driving machine output absorbed by the dynamometer can be determined by the degree of the throttle valve opening and the automobile speed, as illustrated in FIG. 12.

If an actual automobile B' is used for testing instead of the driving machine 12, the operative conditions of a brake can be added to the aforesaid data to simulate the actual running conditions more accurately. Such operative conditions of the brake can be easily reproduced by using a means similar to that related to reproduction of the clutch operation.

As described in the foregoing, with the device according to the present invention, the actual running conditions of an automobile on streets can be automatically reproduced on a test platform without testing personnel or test operators. The power output characteristics of an automobile during actual running, which has heretofore been difficult to analyze, can now be analyzed with ease. The endurance test can be performed on a test platform, and hence, actual running of an automobile for endurance test is not necessary. Thus, actual man-hours necessary for testing can be drastically saved. In addition, the device can be used for various experiments for development, such as experiments concerning air pollution. Furthermore, the testing device according to the present invention can be also applied to jet engines having no carburetor, such as gasoline jet engines and diesel jet engines.

Moreover, by combining the testing device with an electronic computer, test data for a number of automobiles can be read out of the aforesaid recording-reproducing means by the computer and stored therein, so that a plurality of automobiles can be tested simultaneously or intermittently on test platforms arranged in parallel.

In the foregoing, electric signals to be used as the media for carrying information on automobile running conditions have been described as voltage signals, but various other forms of electric signal, such as pulse signals, can be also utilized satisfactorily.

What is claimed is:

1. In a system for programmed operation and testing of an automobile having a manually shifting transmission on a test platform and including a first transducer means for generating a first electric signal corresponding to an engine carburetor throttle valve opening, a second transducer means for generating a second electric signal corresponding to an automobile speed, a third transducer means for generating a third electric signal corresponding to the actuation of a clutch mechanism in said automobile, and a fourth transducer means for generating a fourth electric signal corresponding to the position of a speed change gear lever of said automobile, a recording-reproducing means for recording and reproducing said generated electric signals, a test platform on which an automobile may be placed and said recorded information be reproduced, said test platform having rollers mounted thereon for engagement with the drive wheels of said automobile, a dynamometer drivingly connected to said rolls, a first control means for operating an engine carburetor throttle valve of said automobile in response to said first electric signal reproduced by said recording-reproducing means, a second control means for controlling said dynamometer in response to said second electric signals reproduced by said recording-reproducing means, a third control means for operating a clutch mechanism of said automobile in response to said third electric signals reproduced by said recording-reproducing means, and a fourth control means for controlling the shift lever of a speed change gear of said automobile in response to said fourth electric signals reproduced by said recording-reproducing means, wherein the improvement comprises said first transducer means including a rotary potentiometer having a shaft connected to said carburetor throttle valve rotary vane so as to rotate in proportion to the degree of said throttle valve opening, said potentiometer being adapted to generate an output voltage proportional to the degree of the throttle valve opening; said second transducer means including a magnetic pick-up disposed adjacent to an axle of the automobile and adapted to generate a pulse for each predetermined angular rotation of said axle, and a wave shaping means responsive to said pulses for producing a linearly varying output voltage, the magnitude of said output voltage being proportional to the rotary speed of said automobile axle; said third transducer means including a potentiometer associated with a clutch pedal, said potentiometer being connected to a D.C. power source, said D.C. power source being adapted to produce an output voltage representing the operative position of said clutch pedal in response to changes in said potentiometer; and said fourth transducer means comprising at least a first and a second two-position micro-switch, said first and second micro-switches being adapted to represent at least four operative positions of said speed shift lever by producing four different operative voltages depending on the position of said speed shift lever, and a D.C. power source adapted to produce an output voltage variably responsive to said four different operative conditions of said first and second two-position micro-switches; the output voltages of said transducer means being recorded by said recording-reproducing means to be reproduced for controlling said test platform, whereby the actual road operating conditions of an automobile may be reproduced on a vehicle mounted on said test platform.

2. A device according to claim 1, wherein said first two-position micro switch occupies a first position when said shift lever is in a first-second select position and occupies a second position when said shift lever is in a third-fourth select position, and said second two-position micro switch occupies a first position when said shift lever is in a first-third shift position and occupies a second position when said shift lever is in a second-fourth position, whereby four distinct electric signals are generated in response to the particular gear position of the shift lever.

3. In a system for simulating the operation of an automobile having a manually shifting transmission on a test platform and including a first transducer means for generating a first electric signal corresponding to an engine carburetor throttle valve opening, a second transducer means for generating a second electric signal corresponding to an automobile speed, a third transducer means for generating a third electric signal corresponding to an automobile speed, a third transducer means for generating a third electric signal corresponding to the operation of a clutch pedal, a fourth transducer means for generating a fourth electric signal corresponding to position of a vehicle transmission shift lever, a recording-reproducing means for recording and reproducing said generated electric signals, a test platform for simulating the performance of said automobile, said test platform having mounted thereon an engine incorporating a throttle valve connected to said engine, a disengaging clutch drivingly connected between said engine and said transmission, a dynamometer mounted on said test platform and being drivingly connected to the output of said transmission for absorbing the power output from said engine, a first control means for operating said throttle valve of said engine in response to said first electric signal produced by said recording-reproducing means, a second control means for operating said dynamometer in response to said second electric signal being reproduced by said recording-reproducing means, a third control means for operating said clutch mechanism of said engine in response to said third electric signals reproduced by said recording-reproducing means, and a fourth control means for operating the shift lever of said transmission coupled to said engine in response to said fourth electric signal reproduced by said recording-reproducng means, wherein the improvement comprises said first transducer means including a rotary potentiometer having a shaft connected to said carburetor throttle valve rotary vane so as to rotate in proportion to the degree of said throttle valve opening, said potentiometer being adapted to generate an output voltage proportional to the degree of the throttle valve opening; said second transducer means including a magnetic pick-up disposed adjacent to an axle of the automobile and adapted to generate a pulse for each predetermined angular rotation of said axle, and a wave shaping means responsive to said pulses for producing a linearly varying output voltage, the magnitude of said output voltage being proportional to the rotary speed of said automobile axle; said third transducer means including a potentiometer associated with a clutch pedal, said potentiometer being connected to a D.C. power source, said D.C. power source being adapted to produce an output voltage representing the operative position of said clutch pedal in response to changes in said potentiometer; and said fourth transducer means comprising at least a first and a second two-position micro switch, said first and second micro switches being adapted to represent at least four operative positions of said speed shift lever by producing four different operative voltages depending on the position of said speed shift lever, and a D.C. power source adapted to produce an output voltage variably responsive to said four different operative conditions of said first and second two-position micro switches; the output voltages of said transducer means being recorded by said recording-reproducing means to be reproduced for controlling said test platform, whereby the actual running conditions of the automobile as recorded by said recording-reproducing means can be reproduced on said test platform.

4. A device according to claim 3, wherein said first two-position micro switch occupies a first position when said shift lever is in a first-second select position and occupies a second position when said shift lever is in a third-fourth select position, and said second two-position micro switch occupies a first position when said shift lever is in a first-third shift position and occupies a second position when said shift lever is in a second-fourth position, whereby four distinct electric signals are generated in response to the particular gear position of the shift lever.

References Cited
UNITED STATES PATENTS

| | | | |
|---|---|---|---|
| 1,964,532 | 6/1934 | Platzer | 73—117 |
| 2,218,136 | 10/1940 | Price | 192—.073 |
| 2,982,128 | 5/1961 | Gibson et al. | 73—117 |
| 3,016,739 | 1/1962 | Jonach et al. | 73—117.3 |
| 3,050,994 | 8/1962 | Heigl et al. | 73—117 |
| 3,099,154 | 7/1963 | Vanderbilt | 73—117.3 |
| 3,333,463 | 8/1967 | Hollinghurst | 73—117 |
| 3,363,455 | 1/1968 | Vanderbilt | 73—118 |

RICHARD C. QUEISSER, Primary Examiner

C. E. SNEE III, Assistant Examiner